US008176482B1

(12) United States Patent
Felix (10) Patent No.: US 8,176,482 B1
(45) Date of Patent: May 8, 2012

(54) METHODS AND SYSTEMS FOR INSERTING SOFTWARE APPLICATIONS INTO IMAGES (75) Inventor: Gregory Felix, Lehi, UT (US)

(73) Assignee: Symantec Corporation, Mountain City, CA (US)

( * ) Notice: Subject to any disclaimer, the term of this patent is extended or adjusted under 35 U.S.C. 154(b) by 1076 days.

(21) Appl. No.: 12/057,919

(22) Filed: Mar. 28, 2008

(51) Int. Cl.
G06F 9/44 (2006.01)

(52) U.S. Cl. ........................................ 717/168; 718/1
(58) Field of Classification Search ........... 717/168–178
See application file for complete search history.

(56) References Cited

U.S. PATENT DOCUMENTS

| 7,117,495 | B2 | 10/2006 | Blaser et al. | |
|---|---|---|---|---|
| 7,162,724 | B2 | 1/2007 | Blaser et al. | |
| 7,165,260 | B2 | 1/2007 | Blaser et al. | |
| 7,461,086 | B1 | 12/2008 | Hurren et al. | |
| 7,461,096 | B1 | 12/2008 | Hurren et al. | |
| 7,496,931 | B2 | 2/2009 | Cook et al. | |
| 7,512,977 | B2 | 3/2009 | Cook et al. | |
| 7,519,963 | B1 | 4/2009 | Blaser et al. | |
| 7,542,988 | B1 | 6/2009 | Cook et al. | |
| 7,549,164 | B2 | 6/2009 | Cook et al. | |
| 7,620,956 | B2 | 11/2009 | Cook et al. | |
| 7,877,413 | B1 | 1/2011 | Cook et al. | |
| 7,886,291 | B1 | 2/2011 | Jones et al. | |
| 7,945,897 | B1 | 5/2011 | Cook | |
| 7,954,150 | B2 * | 5/2011 | Croft et al. ........................ 726/21 |
| 7,970,789 | B1 | 6/2011 | Blaser et al. | |
| 8,010,961 | B1 | 8/2011 | Cook et al. | |
| 2003/0233490 | A1 * | 12/2003 | Blaser et al. ................ 709/328 |
| 2007/0180450 | A1 | 8/2007 | Croft et al. | |
| 2007/0198656 | A1 * | 8/2007 | Mazzaferri et al. ........... 709/218 |
| 2008/0034365 | A1 * | 2/2008 | Dahlstedt ........................ 718/1 |
| 2008/0144471 | A1 * | 6/2008 | Garapati et al. ................ 369/99 |
| 2009/0217262 | A1 * | 8/2009 | Manczak et al. ................. 718/1 |
| 2011/0061045 | A1 | 3/2011 | Phillips | |

OTHER PUBLICATIONS

Duenas et al.; System Virtualization Tools for Software Development.*
Galan et al.; User of Virtualization Tools in Computer Network laboratories.*
Jared Blaser; Process Tracking Application Layered System; U.S. Appl. No. 11/324,571, filed Jan. 3, 2006.
Non-Final Office Action received in related U.S. Appl. No. 11/324,571; Jul. 9, 2010.
Final Office Action received in related U.S. Appl. No. 11/324,571; Nov. 26, 2010.
Randall Cook; Systems, Apparatus, and Methods for Layered Execution; U.S. Appl. No. 11/959,700, filed Dec. 19, 2007.
Non-Final Office Action received in related U.S. Appl. No. 11/959,700; Jul. 22, 2011.
Randall Cook; Dynamic Insertion and Removal of Virtual Software Sub-Layers; U.S. Appl. No. 12/058,782, filed Mar. 31, 2008.
Non-Final Office Action received in related U.S. Appl. No. 12/058,782; Aug. 3, 2011.

(Continued)

Primary Examiner — Fred I Ehichioya
Assistant Examiner — Tina Huynh
(74) Attorney, Agent, or Firm — Advantedge Law Group (57) ABSTRACT A computer-implemented method may include identifying an image of a first storage device, identifying a software application, and inserting the software application into the image. The method may also include inserting a software virtualization layer into the image. The method may include inserting a software package into the image. Various other methods, systems, and computer-readable media for inserting software applications into images are also disclosed.

19 Claims, 9 Drawing Sheets

OTHER PUBLICATIONS

Jordan Sanderson; Methods and Systems for Activating and Deactivating Virtualization Layers; U.S. Appl. No. 12/414,170, filed Mar. 30, 2009.
Karl Bunnell et al.; Methods and Systems for Merging Virtualization Sublayers; U.S. Appl. No. 12/396,969, filed Mar. 3, 2009.
Lance TeNgaio; Distributed Application Virtualization; U.S. Appl. No. 12/142,549, filed Jun. 19, 2008.
Jeremy Hurren; Systems and Methods for Maintaining Settings for Multiple Applications; U.S. Appl. No. 12/147,939, filed Jun. 27, 2008.
Jeremy Hurren; Feature Based Software Virtualization; U.S. Appl. No. 11/960,706, filed Dec. 20, 2007.
Karl Bunnell et al.; Methods and Systems for Creating and Applying Patches for Virtualized Applications; U.S. Appl. No. 12/369,512, filed Feb. 11, 2009.
Randall Cook; Automatic Virtualization Based on User-Defined Criteria; U.S. Appl. No. 12/024,079, filed Jan. 31, 2008.
Karl Bunnell; Methods and Systems for Creating Snapshots of Virtualized Applications; U.S. Appl. No. 12/371,116, filed Feb. 13, 2009.
Cynthia Bringhurst; Systems and Methods for Virtualizing Software Associated with External Computer Hardware Devices; U.S. Appl. No. 12/554,413, filed Sep. 4, 2009.
Bradley Baird; Systems and Methods for Merging Virtual Layers; U.S. Appl. No. 12/843,098, filed Jul. 26, 2010.
Bruce McCordendale; Systems and Methods for Controlling Access to Data Through Application Virtualization Layers; U.S. Appl. No. 12/147,700, filed Jun. 27, 2008.
Michael Spertus; Systems and Methods for Using Virtualization to Implement Information Rights Management; U.S. Appl. No. 12/715,213, filed Mar. 1, 2010.

* cited by examiner

METHODS AND SYSTEMS FOR INSERTING SOFTWARE APPLICATIONS INTO IMAGES

CROSS REFERENCES TO RELATED APPLICATIONS

This application is related to U.S. Pat. No. 7,162,724 filed 11 Jun. 2003 and titled "Layered Computing Systems and Methods", U.S. Pat. No. 7,117,495 filed 11 Jun. 2003 and titled "Systems and Methods for the Creation of Software Packages Using Layered Systems", and U.S. Pat. No. 7,165,260 filed 11 Jun. 2003 and titled "Layered Computing Systems and Methods for Insecure Environments", the disclosures of each of which are incorporated, in their entirety, by this reference.

BACKGROUND

Many business organizations and governmental entities may rely on large data centers, including hundreds or thousands of individual computer hosts or servers, to provide support for complex mission-critical applications. The collection of computer hosts within a data center may be heterogeneous in nature, including many different types of hosts from many different manufacturers, supporting different operating systems and a variety of hardware devices such as disks, network cards, and the like from different hardware vendors. In addition to the application servers at the data centers, an information technology (IT) department may also need to support a large number of workstations (such as desktop and/or laptop computer systems) and supporting servers (such as email servers, web servers) for use by the employees of the organization.

As the computing needs of an organization grow, more and more processing power may need to be deployed. The process of allocating additional resources such as new computer hosts, additional storage, additional networking bandwidth, and other devices in response to growing needs within an organization may be termed "provisioning." Configuring individual new hosts manually would be increasingly difficult, expensive and error-prone as the environment scales in size and complexity. Therefore, in some IT organizations, specialized provisioning tools may be used to ensure a desired degree of consistency when configuring newly allocated hosts. A provisioning tool may, for example, allow an administrator to install a desired version of an operating system and a desired set of application software on a source computer host, and to create a disk image (i.e., a copy) of the system disk of the source computer host for use in installing newly provisioned hosts.

The disk image may then be written to a system disk at each newly provisioned host, so that all newly provisioned hosts are deployed with a common operating system version and common application software. Such a provisioning technique of using a disk image to install software at a host, instead of installing a newly provisioned host manually from installation CDs or other removable media, may be termed image-based provisioning. Image-based provisioning may provide several advantages over more traditional provisioning or installation techniques, including a reduction in total installation time, better support for automation and a corresponding reduction in the probability of human errors. In many cases a standard set of disk images for image-based provisioning may be created, (e.g., a set including one disk image corresponding to each operating system in use within a data center) and employed repeatedly as new hosts are provisioned.

One problem with image-based provisioning is that the imaging may only capture what was contained on the source computer. If an administrator wants to add a program to a host target of a disk image, the administrator may need to deploy the image and then install the program after the image has been deployed to the host. This manual process may be time-consuming for system administrators. In other words, traditional disk imaging systems may be inefficient because they may lack post-imaging customization tools.

SUMMARY

The instant disclosure is directed to inserting a software application into an image after the images have been created. According to various embodiments, a computer-implemented method may comprise identifying an image of a first storage device, identifying a software application, and inserting the software application into the image. In some embodiments, inserting the software application into the image may comprise inserting a software virtualization layer into the image.

The software application may be programmed to interface with an operating system of the image through the virtualization layer. In some embodiments, inserting the software application into the image may comprise inserting a virtualization-layer-installation tool into the image. The virtualization-layer-installation tool may comprise the software virtualization layer.

In some embodiments, inserting the software application into the image may comprise inserting a software package into the image. The software package may comprise the software application. In some embodiments, the software package may comprise a repackaged software application, such as a rapid install package or a WISE package. According to various embodiments, inserting the software application into the image may comprise inserting a software-virtualization-system package into the image. The software-virtualization-system package may comprise the software application and a virtualization-layer-installation tool.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following is intended to provide a detailed description of various exemplary embodiments and should not be taken to be limiting in any way. Various exemplary methods and systems for including software applications in images are described and/or illustrated herein. In some embodiments, inserting a software application into an image may comprise inserting a software virtualization layer into the image. In other embodiments, inserting the software application into the image may comprise inserting a software package into the image. Various other embodiments of inserting software packages into images are described herein.

Figure 1:
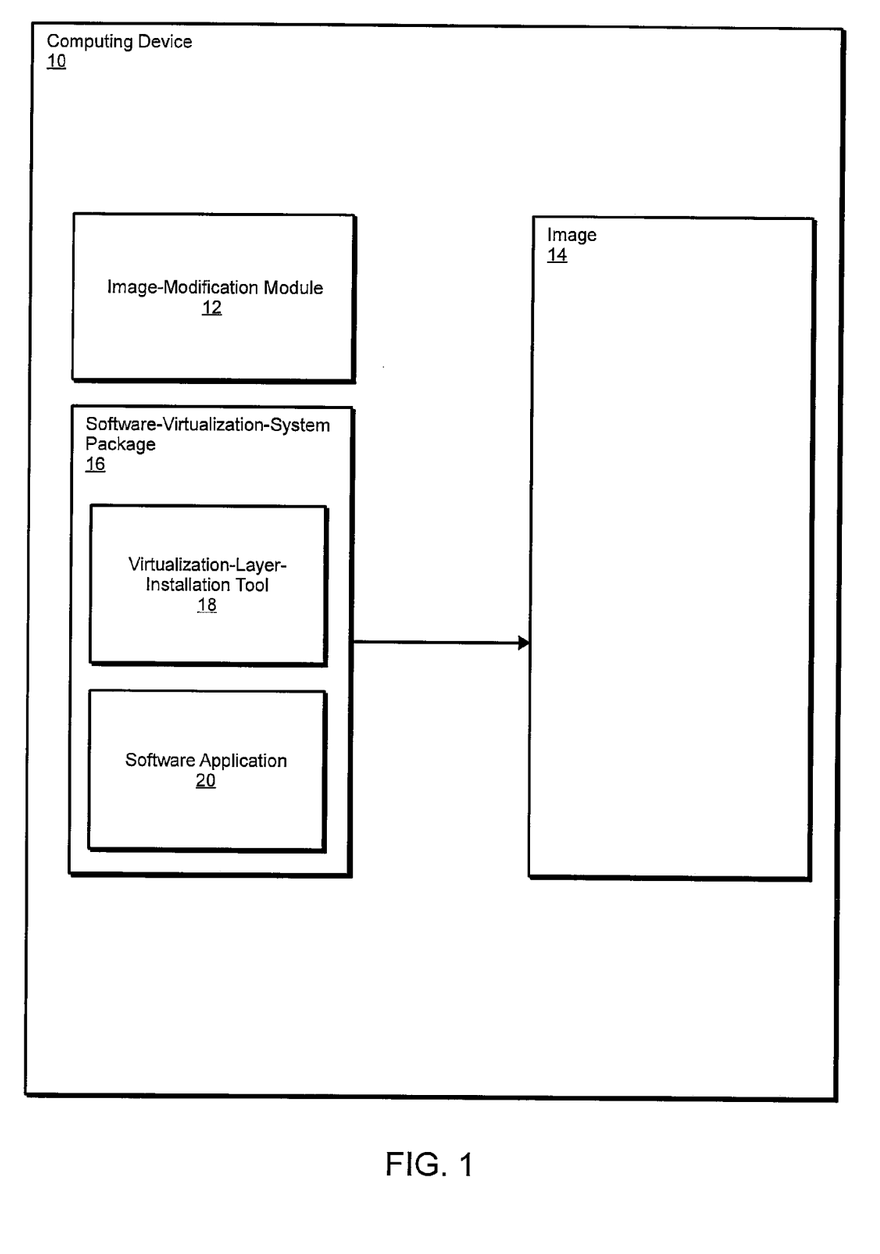
FIG. 1 is a block diagram of an exemplary computing device according to certain embodiments.
Figure 6:
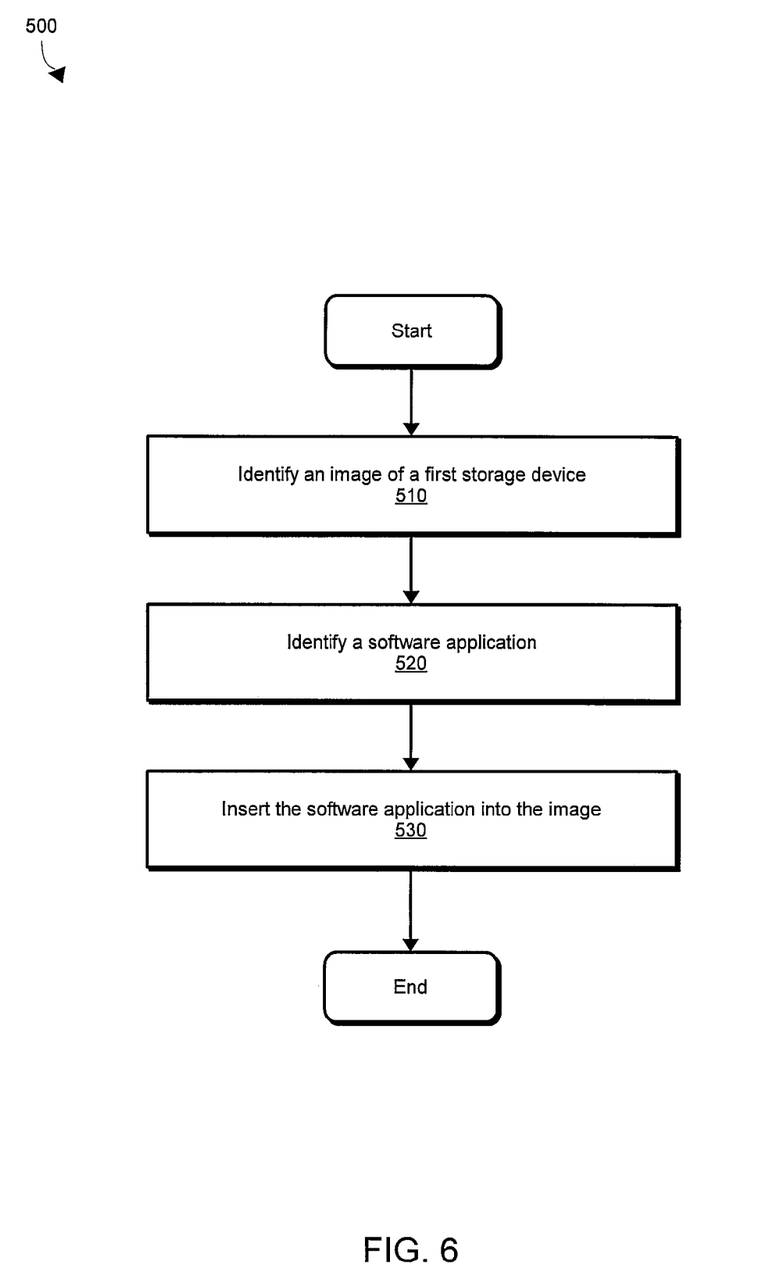
FIG. 6 is a flow diagram of an exemplary method for inserting a software application into an image according to certain embodiments.
Figure 7:
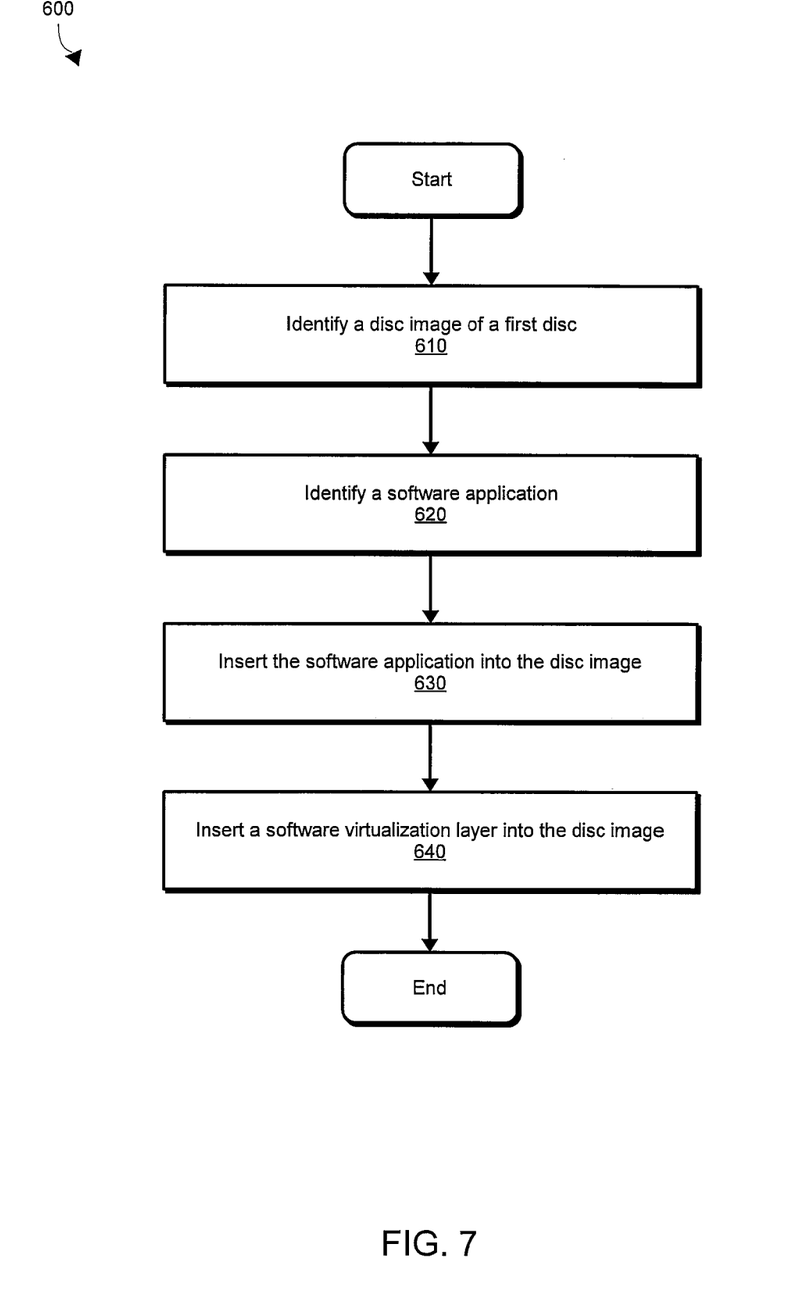
FIG. 7 is a flow diagram of an exemplary method for inserting a software application into an image according to certain embodiments.

FIG. 1 illustrates an exemplary computing device with an image modification module for inserting software applications into images. In some embodiments, software applications may be inserted into images by implementing layered-computing technology. FIGS. 2-5 show various examples of layered computing systems according to various embodiments. FIGS. 6 and 7 show exemplary methods for using the principles disclosed herein to insert a software application into an image.

FIG. 1 shows an exemplary computing device 10 with an image-modification module 12. Image-modification module 12 may be programmed to insert or install a software application, such as software application 20, into image 14. In some embodiments, image 14 may be a blockwise image of a computing device, rather than a file-by-file backup of a computing device. Sector-by-sector images and cluster-by-cluster images are examples of blockwise images. Image 14 may be an image of any storage device of a computing system. For example, image 14 may be an image of a desktop computer hard drive, a laptop computer hard drive, a portable computing device hard drive, a network storage device, or any other computing or storage device.

The process of creating an image, such as image 14, may typically begin with a selection (e.g., by an IT administrator) of a desired software configuration that is to be consistently deployed across new, uninstalled computer systems or hosts. The term "uninstalled host," as used herein, may refer to a host computer system that does not have a desired operating system, or a desired version of an operating system, installed on it. The desired software configuration may include a specific version of an operating system and one or more applications.

The operating system as well as the applications may be selected based on the set of tasks for which the new hosts are being brought into service. For example, in an environment where the new hosts are to be used by software engineers for software development as well as for standard office tasks such as e-mail, a version of MICROSOFT WINDOWS may be selected as the operating system, and the applications installed may include one or more e-mail clients, productivity software such as spreadsheets and word processors, and a software development environment (SDE) selected according to a corporate or departmental policy.

The desired software configuration may then be installed (e.g., using a standard installation technique such as manual installation from one or more installation CDs) on a particular host selected as a "master" or "source" host, from which a disk image may be obtained in a later step. The desired operating system and desired application software may be installed on the master host in this step. For some operating systems, one or more tasks typically performed during installation may be modified or left out during the installation of the master, in order to simplify later steps of image-based provisioning. For example, in a MICROSOFT WINDOWS environment, a step of identifying a network domain for the master host may be omitted, and the system administrator password may be left blank. One or more default user profiles may also be set up on the master host at this stage. At the end of the installation, a system administrator or a tool such as an automated script may validate that all the desired software components are present on the master system.

After a successful validation, a master host may need to be prepared for a creation of a disk image. For example, the master host may be prepared using a special system preparation utility (e.g., MICROSOFT's "SYSPREP" utility). The system preparation utility may perform a number of operations, such as a modification of a configuration setting or parameter to ensure that a system setup tool (e.g., Microsoft's "Mini-Setup Wizard") is invoked the next time the master (or another host installed using a disk image from the master) is booted. The system setup tool, may, for example, allow a specification of such host-specific information as a host name, an administrator password, an identification of a time zone, etc., when invoked during the boot process.

The next step in image-based provisioning may be the creation of the disk image itself. That is, the contents of a system disk (i.e., a disk on which the operating system and applications were previously installed on the master host) may be copied or saved (e.g., on a storage device external to the master host).

The administrator may desire to create images with different applications. In traditional imaging systems, if a system administrator needs to deploy images with different applications installed, for each desired configuration the administrator would need to install the applications on a source host and go through the process of creating a separate image. In contrast, embodiments of the instant disclosure allow the administrator to create a single image and customize the image by adding applications. This customization process may be more efficient than prior imaging solutions.

As previously noted, image-modification module 12 may allow an administrator (or any other user) to insert a software application into an image. Image-modification module 12 may be any application, module, plug-in, or other computer-executable instruction capable of inserting a software application (e.g., software application 20) into an image (e.g., image 14) after the image has been created.

In some embodiments, image-modification module 12 may insert software application 20 into image 14 at a designated location within image 14. For example, image-modification module 12 may insert software application 20 in a specific special folder, directory, file, or at a special offset within image 14. Software application 20 may also be inserted in any other suitable location within image 14.

In some embodiments, software application 20 may be included in a software-virtualization-system package 16 that also includes a virtualization-layer-installation tool 18. Software-virtualization-system package 16 may be a software package that includes the programming (e.g., virtualization-layer-installation tool 18) to install a virtualization layer in a destination computing device after image 14 is deployed to the destination computing device.

For example, after software-virtualization-system package 16 is inserted into image 14, image 14 may be copied to an uninstalled host where the desired software configuration is to be installed. Once the image is loaded (e.g., on a target system disk) at the uninstalled host, the host may be booted. In cases where the system setup tool was configured to be invoked upon the next reboot (as described above), the host-specific information may be provided (either manually or via a script or configuration file) to the system setup tool during system initialization, and the previously uninstalled host may be brought up to provide normal operation.

During system initialization, software-virtualization-system package 16 may execute and may install a virtualization layer on the host. The software-virtualization-system package may also initiate installation of software application 20. Software application 20 may be installed through the virtualization layer. In other embodiments, software application 20 and the virtualization layer may be installed in image 14 before image 14 is deployed. For example, image-modification module 12 may modify registry settings, files, folders, and/or other data in image 14 so that when image 14 is deployed to a destination computer, software application 20 will be present on the destination computer as though software application 20 had been installed on the source computer before the image was created. "Inserting" an application into an image refers to installing and/or otherwise including the application in the image.

Allowing applications and data to be inserted into virtual layers (application layers and data layers) instead of being installed to the base file system and registry may have various advantages. For example, installing an application into a virtual layer in an image may be simpler and faster because it may not require modification of the base file system and registry. Installing an application into a virtual layer of an image may also have various other advantages over installing applications directly to a base file system and registry. For example, computing systems may be susceptible to application conflicts with the host operating system and other applications. When an application is installed to an operating system, a number of globally-accessible files are often placed on the computing system. Such files may include shared libraries and system configuration. The shared libraries are often provided in different versions, with applications requiring one version or another. A mismatch between a library version and a version required by an application sometimes results in that application crashing, becoming inoperable, or exhibiting other errors. Shared configuration elements are sometimes globally available to applications, which may write a favored configuration thereto. Following a write to that configuration, other applications may be unable to read the configuration properly, or may be unable to function under a new specified configuration. Thus, following installation of a new application to a computer, other applications may not work properly or may stop working.

In contrast to the problems associated with directly installing applications to a base-file system and registry, a virtualization layer approach of installing applications may avoid the conflicts and other issues associated with traditional application installations. A layered approach may provide virtual layers that can be managed as a unit for the purposes of exporting, importing, enabling, disabling, and otherwise managing applications with a greater degree of flexibility and reliability.

Figure 2:
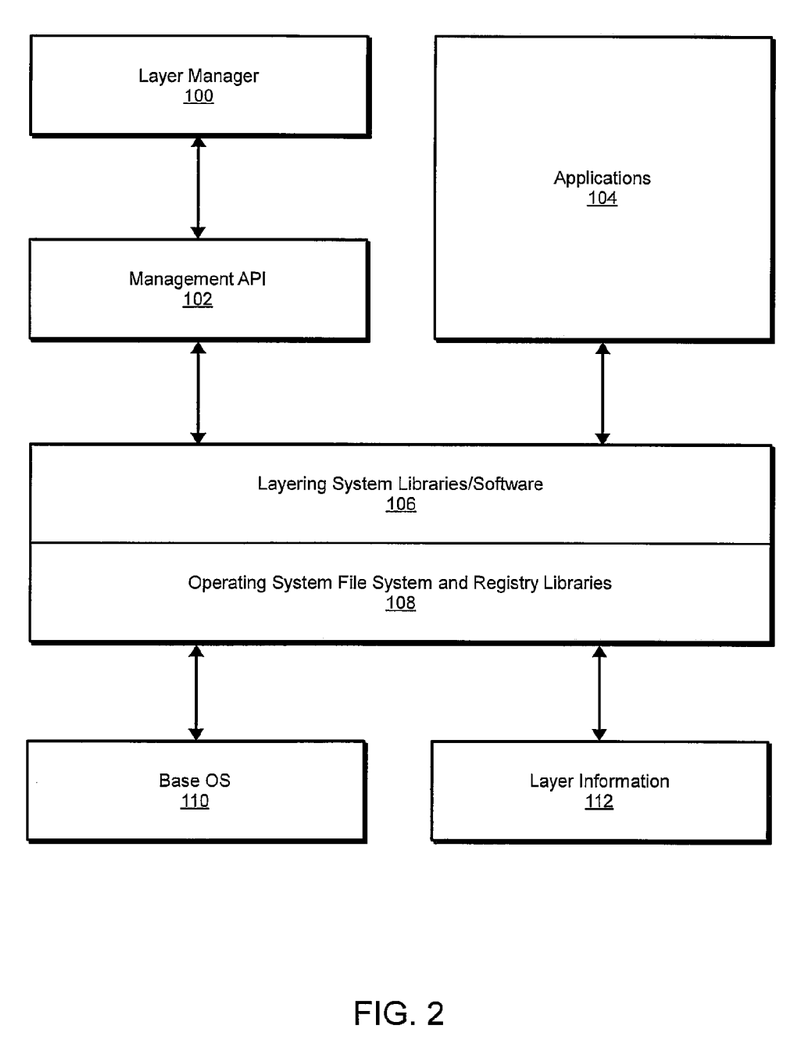
FIG. 2 is a block diagram of exemplary components of a layering computer system at a conceptual level according to certain embodiments.

FIG. 2 shows components of an image with a virtualization layer at a conceptual level. A base operating system 110 may form a platform with which applications may be executed and from which files may be accessed in file systems. This operating system 110 may include registry settings, which may be globally available to applications for reading and writing. The image may include libraries 108 for executing the functions of the operating system, including operating system files and registries, and other operating system functions. Layering system libraries and software 106 may be tied into libraries 108. Layering system libraries and software 106 may interpret file system and registry accesses from applications 104. The layering system software 106 may perform computations to determine whether the access should be permitted to continue to the base operating system 110, or should be redirected to layer information 112. Layer information 112 may be the information relating to the contents of files and registry settings. Layer manager application 100 may control configuration of the layering system software 106 through a management Application Programming Interface (API) 102.

Figure 3:
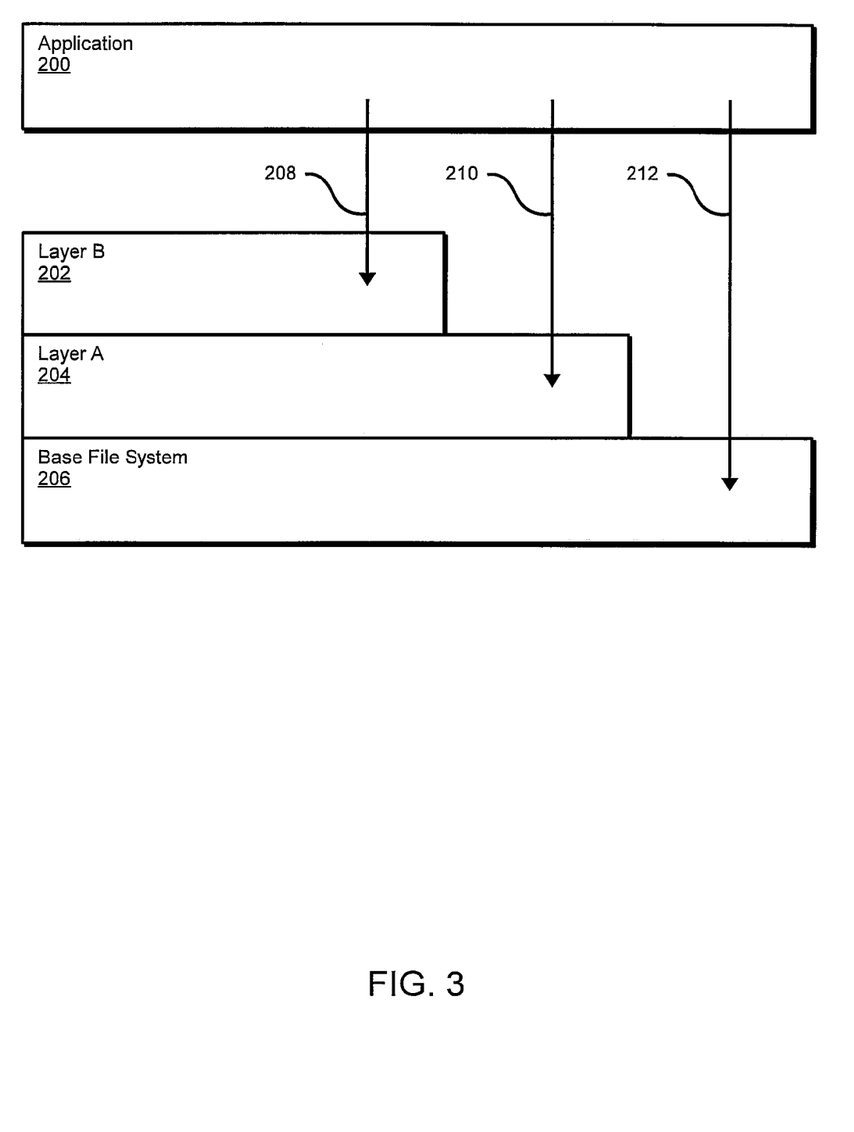
FIG. 3 is a block diagram of an exemplary operation of a layering computer system at a conceptual level according to certain embodiments.

FIG. 3 shows the operation of a computing system with a virtualization layer at a conceptual level. After a source computer with a base file system 206 is imaged, an application 200 and a virtualization system comprising a layer B 202 and a layer A 204 may be inserted into the image. Layer B may have priority over layer A, which in turn may have priority over a base file system. The image may be deployed to a destination computer, and application 200 may operate as follows. A first file access 208 may be made by application 200. The virtualization system may first search in layer B 202 for the requested file. Layer B 202 may include an entry for file access 208, and the corresponding file in layer B 202 may be opened and returned to the application. Since layer B 202 has priority over layer A 204 and base file system 206, even if layer A 204 and base file system 206 have entries that correspond to file access 208, the virtualization system will return the entry from layer B 202.

Application 200 may make another file access 210. The virtualization system may not find a corresponding entry in layer B 202, but may find an entry in layer A 204. A third file access request 212 may not have a corresponding entry in layer B 202 or layer A 204, and the virtualization system may therefore return an entry from base file system 206.

Figure 4:
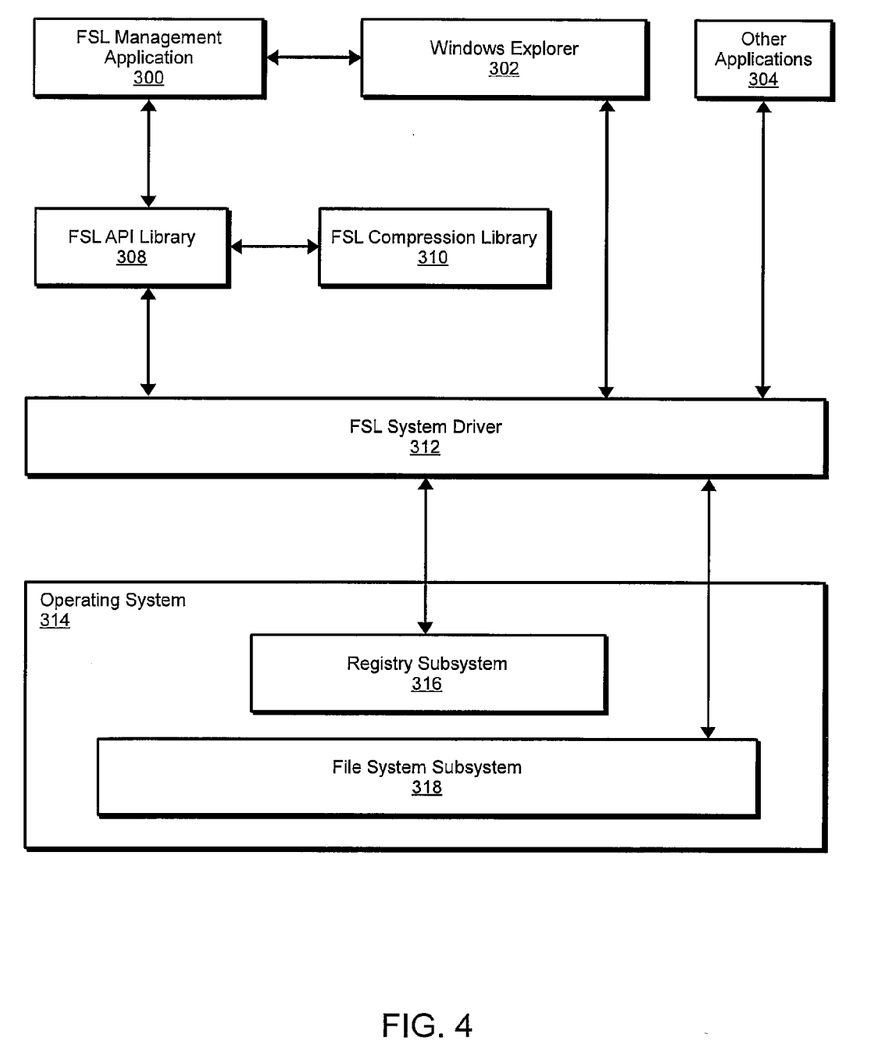
FIG. 4 is a block diagram of a layering computer system according to certain embodiments.

FIG. 4 shows an example of an image with a virtualization layer installed. The image may include an operating system 314. Operating system 314 may comprise subsystems for handling a registry 316 and a file system 318. A system driver 312 may be installed on operating system 314 and may have first processing priority for registry and file system accesses. A management application 300 may provide an administrator with an interface to interact with system driver 312, and make changes to layers. An API library 308 may provide a convenient interface for management application 300 to interface with system driver 312.

Management application 300 may provide notices to the Windows Explorer 302 that the contents of a mounted file system have been changed. Other applications 304 may interact with the system, performing read and write operations to the file system and registry through system driver 312. The compression library 310 may be provided to compress layer information, especially for layer archives exported by the system.

Figure 5:
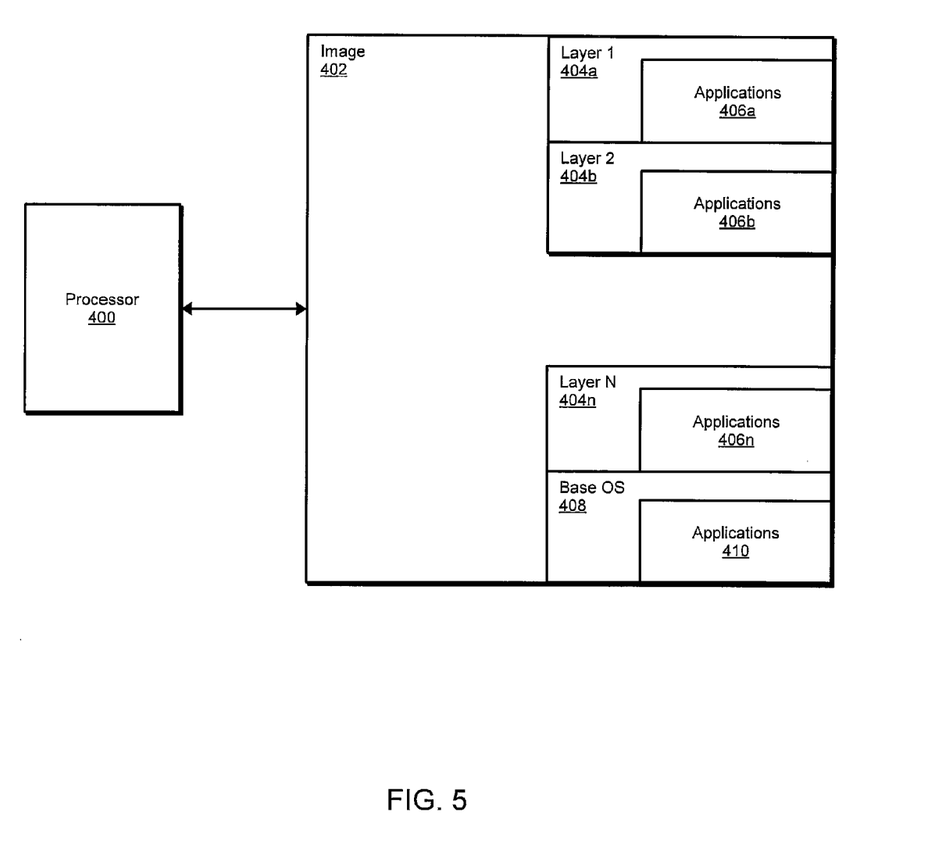
FIG. 5 is a block diagram of an exemplary layering computer system at an organizational level according to certain embodiments.

FIG. 5 illustrates an example of virtualization layers installed on an image 402. Image 402 may contain a number of layers 404a-n. Applications 406a-n may be installed on layers 404a-n, respectively. As referred to herein, a layer (or virtualization layer) may refer to a set of file system and registry changes that may be managed by layered system software. In some embodiments, a layer may contain changes to one or more file systems but may not contain registry changes.

A layer may isolate an application from a base file system and may include files and a directory structure of the application's installation. When the layer is inserted (or enabled) in an image, the application files and directories may be shadowed or overlaid over the regular operating file system. Shared libraries (such as DLLs), system accessible configuration (such as registry entries), and version control may be managed by a layering subsystem.

Though each layer may be a separate and individual entity within an image, the application files, data, and system-accessible configuration may be presented as though they resided in their respective ordinary locations. Thus, an application stored in a layer may appear to the operating system of a deployed image as if it had been installed using traditional installation techniques.

As previously noted, inserting applications on virtualization layers in an image may have numerous advantages. For example, if the applications are stored individually in layers, interactions between application files may no longer occur due to conflicting shared libraries (DLLs), as each application may use its virtual libraries before accessing the base operating system. In some embodiments, applications inserted into a layer in an image may be safely and completely uninstalled or removed from the image by removing the layer from the image.

The instant disclosure may provide an image in which application layers are isolated from other applications on a computer. An application layer may be defined to be a group of files in combination with any associated application configuration stored to operating system files. An application of a layered system may be an application in the most commonly used meaning, such as word processors, browsers, system tools, games, and the like, or may extend to other software installed to a host providing an environment, such as a graphical user interface or environmental shell. Isolating application files and configuration in a layer may provide several benefits, including the ability to delete, disable and enable applications in a simple way and provide a barrier between applications that may use conflicting configuration or library files. Inserting layers into images may result in enhanced stability, reliability, usability, and security of a destination computing system of the image.

In some embodiments, layers may be used to insert or install software applications into images after the images have been created. As shown in FIG. 6, an image-modification module may identify an image of a first storage device (Step 510). The first storage device may be any suitable storage device or devices of a computer or network device. Identifying an image of a first storage device may comprise creating an image, selecting an image, or otherwise identifying an image to which a software application will be inserted or installed. The image-modification module may identify a software application as well (step 520). Identifying a software application may comprise selecting a software application that is compatible with the operating system installed in the first storage device, or selecting a software application based on any other criteria. After identifying the image and the software application, the image-modification module may insert the software application into the image (step 530).

Inserting the software application into the image may comprise inserting a software virtualization layer into the image. After the image is deployed on a destination device, the software application may interface with an operating system of the image through the virtualization layer.

In some embodiments, inserting the software application into the image may comprise inserting a virtualization-layer-installation tool. The virtualization-layer-installation tool may comprise the software virtualization layer. In some embodiments, inserting the software application into the image may comprise inserting a software-virtualization-system package into the image. The software-virtualization-system package may comprise the software application and the virtualization layer installation tool, as described in FIG. 1.

In some embodiments, inserting the software application into the image may comprise inserting a software package into the image. The software package may comprise a software application. In some embodiments, the software package may comprise a repackaged software application, such as a RAPIDINSTALL package, a WISE package, or any other repackaged software application. A repackaged software application may be an application that is packaged with settings and other user preferences. Therefore, inserting repackaged software into an image may save an administrator or destination device user the effort of configuring the software after the image is installed.

FIG. 7 is a flow diagram for inserting a software application into a disk image. An image modification module may identify a disc image of a first disc (step 610). The image modification module may also identify a software application (step 620) and insert the software application into the disc image (step 630). Then, a software virtualization layer may be inserted into the disc image (Step 640). The software virtualization layer may be programmed to provide an interface for the software application.

Figure 8:
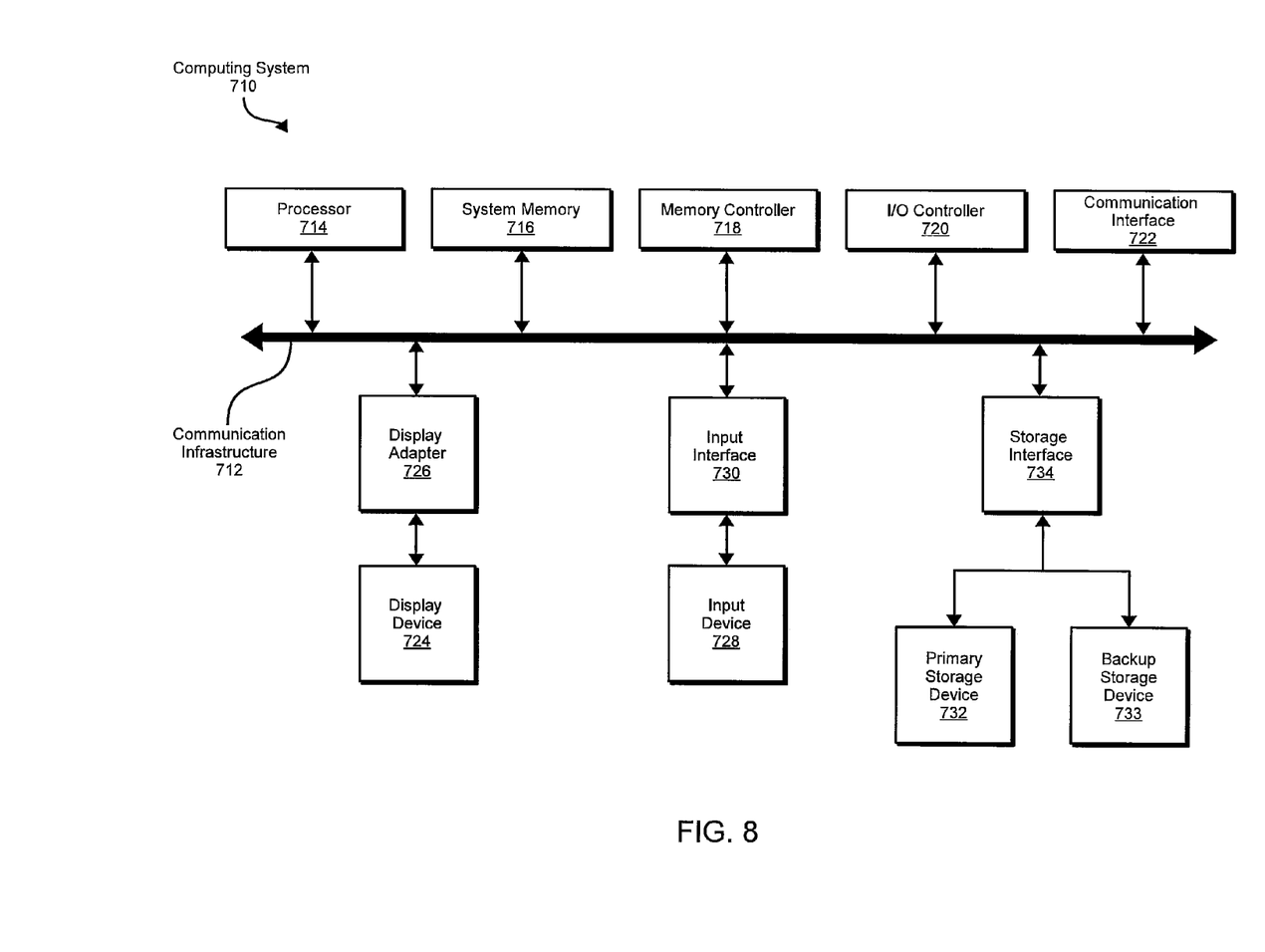
FIG. 8 is a block diagram of an exemplary computing system capable of implementing one or more of the embodiments described and/or illustrated herein.

FIG. 8 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, inserting, imaging, and deploying steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, inserting, imaging, and deploying.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, inserting, imaging, and deploying steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, inserting, imaging, and deploying steps disclosed herein. Communication interface 722 may also be used to perform and/or be a means for performing other steps and features set forth in the instant disclosure.

As illustrated in FIG. 8, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 8, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, inserting, imaging, and deploying steps disclosed herein. Input device 728 may also be used to perform and/or be a means for performing other steps and features set forth in the instant disclosure.

As illustrated in FIG. 8, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, inserting, imaging, and deploying steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 8 need not be present to practice the embodiments descried and/or illustrated herein. The devices and subsystems referenced above may also be interconnected in different ways from that shown in FIG. 8. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 9:
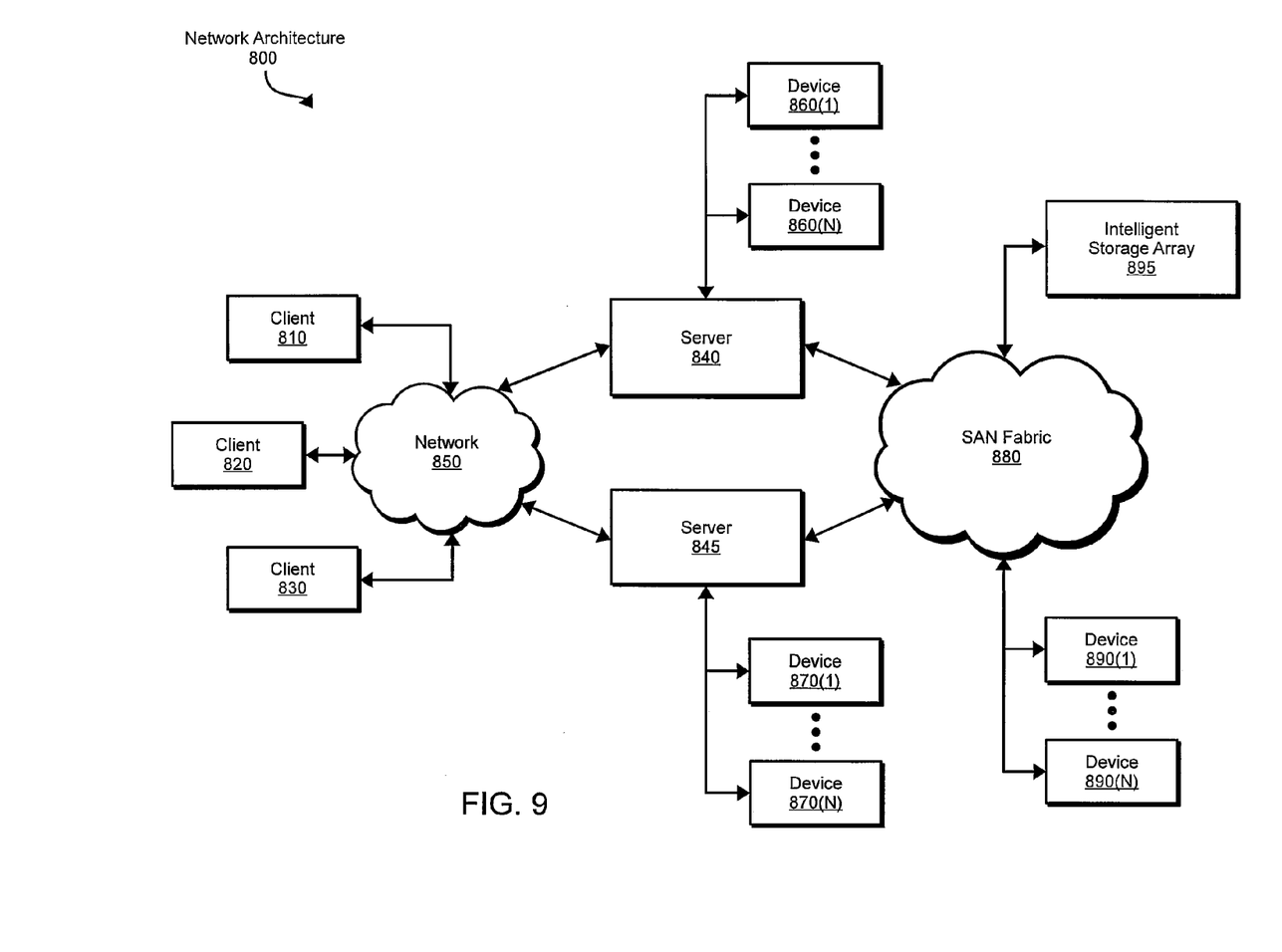
FIG. 9 is a block diagram of an exemplary computing network capable of implementing one or more of the embodiments described and/or illustrated herein.

FIG. 9 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 8. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 9, one or more storage devices 860(1)-(N) may be directly attached to server 840. Similarly, one or more storage devices 890(1)-(N) may be directly attached to server 845. Storage devices 860(1)-(N) and storage devices 890(1)-(N) generally represent any type or form of storage device or medium capable of storing data and/or other computer-readable instructions. In certain embodiments, storage devices 860(1)-(N) and storage devices 890(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 8, a communication interface, such as communication interface 722 in FIG. 8, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, inserting, imaging, and deploying steps disclosed herein. Network architecture 800 may also be used to perform and/or be a means for performing other steps and features set forth in the instant disclosure.

As detailed above, computing system 710 and/or one or more of components of network architecture 800 may perform and/or be a means for performing, either alone or in combination with other elements, one or more steps of the exemplary computer-implemented methods described and/or illustrated herein. According to certain embodiments, a computer-implemented method may comprise identifying an image of a first storage device, identifying a software application, and inserting the software application into the image.

In various embodiments, the computer-implemented method may also comprise inserting the software application into the image by inserting a software virtualization layer into the image. The software application may interface with an operating system of the image through the software virtualization layer.

In some embodiments, inserting the software application into the image may comprise inserting a virtualization-layer-installation tool into the image. The virtualization-layer-installation tool may comprise the software virtualization layer. In at least one embodiment, inserting the software application into the image may comprise inserting a software-virtualization-system package into the image. The software-virtualization-system package may comprise the software application and the virtualization layer installation tool.

In some embodiments, inserting the software application into the image may comprise inserting a software package into the image. The software package may comprise the software application. In at least one embodiment, the software package may comprise a repackaged software application.

In some embodiments, the computer implemented method may comprise imaging the first storage device to create the image. In other embodiments, the computer-implemented method may further comprise deploying the image to a second storage device after the software application is inserted into the image.

In certain embodiments, a computer-implemented method may comprise identifying a disc image of the first disc, identifying a software application, and inserting the software application into the disc image after the disc image is created. The method may also comprise inserting a software virtualization layer into the disc image after the disc image is created. The software virtualization layer may be configured to interface with the software application.

In some embodiments, the computer-implemented method may further comprise inserting a software-virtualization-system package into the disc image. Inserting the software-virtualization-system package may comprise inserting the software application and inserting the virtualization layer. In at least one embodiment, the computer-implemented method may comprise imaging the first disc to create the disc image. In certain embodiments, the computer-implemented method may comprise deploying the disc image to a second disc after the software application is inserted into the disc image.

According to certain embodiments, a computer-readable medium may comprise one or more computer-executable instructions that, when executed by a computing device, may cause the computing device to identify an image of a first storage device, identify a software application, and insert the software application into the image after the image is created.

In some embodiments, the one or more computer-executable instructions may be further operable to insert the software application into the image by inserting a software virtualization layer into the image. The software application may be configured to interface with an operating system of the image through the software virtualization layer. In some embodiments, the one or more computer-executable instructions may be further operable to insert the software application into the image by inserting a virtualization-layer-installation tool into the image. The virtualization-layer-installation tool may comprise the software virtualization layer.

In some embodiments, the one or more computer-executable instructions may be further operable to insert the software application into the image by inserting a software-virtualization-system package into the image. The software-virtualization-system package may comprise the software application and the virtualization layer installation tool.

In some embodiments, the one or more computer-executable instructions may be further operable to insert the software application into the image by inserting a software package into the image. The software package may comprise the software application. In some embodiments, the software package may comprise a repackaged software application. According to at least one embodiment, the one or more computer-executable instructions may be further operable to image the first storage device to create the image. In some embodiments, the one or more computer-executable instructions may be further operable to deploy the image to a second storage device after the software application is inserted into the image.

The instant disclosure refers to registries and registry settings, which may be specific to MICROSOFT WINDOWS operating systems. Those of skill in the art will recognize that registry settings are merely configuration settings for an operating system and applications installed to a computing device, accessible through a system-wide application programming interface (API). The meaning of registries and registry setting is therefore extended to future WINDOWS operating systems and operating systems other than WINDOWS.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method comprising:
 imaging a first storage device to create an image, the image comprising a base file system and registry;
 identifying a software application that is not installed within the image;
 before deploying the image to a second storage device, inserting the software application into the image as a software virtualization layer that overlays the software application over the base file system and registry instead of modifying the base file system and registry such that, when the software virtualization layer is enabled, the software application appears to an operating system of the image as though it were installed in the base file system and registry;
 deploying the image to the second storage device after the software application is inserted into the image.

2. The computer-implemented of claim 1, wherein:
 the virtualization layer is programmed to provide an interface between the software application and the operating system of the image to isolate the software application from the base file system and registry and to provide a barrier between other software applications that use at least one of: conflicting configuration files or conflicting library files.

3. The computer-implemented method of claim 2, wherein:
 inserting the software application into the image comprises inserting a virtualization-layer-installation tool into the image, the virtualization-layer-installation tool comprising the software virtualization layer.

4. The computer-implemented method of claim 3, wherein:
 inserting the software application into the image comprises inserting a software-virtualization-system package into the image, the software-virtualization-system package comprising the software application and the virtualization-layer-installation tool;
 after the image is deployed to the second storage device, the virtualization-layer-installation tool installs the software application to the software virtualization layer.

5. The computer-implemented method of claim 1, wherein:
 inserting the software application into the image comprises installing the software application to the software virtualization layer before the image is deployed to the second storage device such that, after deployment of the image, the software application will be present on the second storage device as though the software application had been installed in the software virtualization layer on the first storage device before the image was created.

6. The computer-implemented method of claim 1, wherein:
 inserting the software application into the image comprises inserting a software package into the image, the software package comprising the software application;
 the software package comprises a repackaged software application that is packaged with at least one of: settings and user preferences such that the software application is pre-configured upon insertion into the image.

7. The computer-implemented method of claim 1, further comprising: after the image is deployed to the second storage device, uninstalling the software application by removing the software virtualization layer from the image.

8. A computer-implemented method comprising:
 imaging a first disk to create a disk image, the disk image comprising a base file system and registry;
 identifying a software application that is not installed within the image;
 before deploying the disk image to a second storage device, inserting the software application into the disk image as a software virtualization layer that overlays the software application over the base file system and registry instead of modifying the base file system and registry such that, when the software virtualization layer is enabled, the software application appears to an operating system of the disk image as though it were installed in the base file system and registry;
 deploying the disk image to the second storage device after the software application is inserted into the disk image.

9. The computer-implemented method of claim 8, further comprising:
 inserting a software-virtualization-system package into the disk image, wherein inserting the software-virtualization system-package comprises inserting the software application and inserting the software virtualization layer.

10. The computer-implemented method of claim 8, further comprising:
 imaging the first disk to create the disk image.

11. The computer-implemented method of claim 10, further comprising:
 deploying the disk image to a second disk after the software application is inserted into the disk image.

12. A non-transitory computer-readable medium comprising one or more computer-executable instructions that, when executed by a computing device, cause the computing device to:
 image a first storage device to create an image, the image comprising a base file system and registry;
 identify a software application that is not installed within the image;
 before deploying the image to a second storage device, insert the software application into the image as a software virtualization layer that overlays the software application over the base file system and registry instead of modifying the base file system and registry such that, when the software virtualization layer is enabled, the software application appears to an operating system of the image as though it were installed in the base file system and registry;
 deploy the image to the second storage device after the software application is inserted into the image.

13. The non-transitory computer-readable medium of claim 12, wherein:
 the virtualization layer is programmed to provide an interface between the software application and the operating system of the image to isolate the software application from the base file system and registry and to provide a barrier between other software applications that use at least one of: conflicting configuration files or conflicting library files.

14. The non-transitory computer-readable medium of claim 13, wherein the one or more computer-executable instructions are further operable to:
 insert the software application into the image by inserting a virtualization-layer-installation tool into the image, the virtualization-layer-installation tool comprising the software virtualization layer.

15. The non-transitory computer-readable medium of claim 14, wherein the one or more computer-executable instructions are further operable to:
  insert the software application into the image by inserting a software-virtualization-system package into the image, the software-virtualization-system package comprising the software application and the virtualization-layer-installation tool.

16. The non-transitory computer-readable medium of claim 12, wherein the one or more computer-executable instructions are further operable to:
  insert the software application into the image by inserting a software package into the image, the software package comprising the software application.

17. The non-transitory computer-readable medium of claim 16, wherein: the software package comprises a repackaged software application.

18. The non-transitory computer-readable medium of claim 12, wherein the one or more computer-executable instructions are further operable to:
  image the first storage device to create the image.

19. The non-transitory computer-readable medium of claim 12, wherein the one or more computer-executable instructions are further operable to:
  deploy the image to the second storage device after the software application is inserted into the image.

\* \* \* \* \*